March 8, 1938.  E. WOLFSON  2,110,315
DENTAL APPLIANCE
Filed Aug. 4, 1936
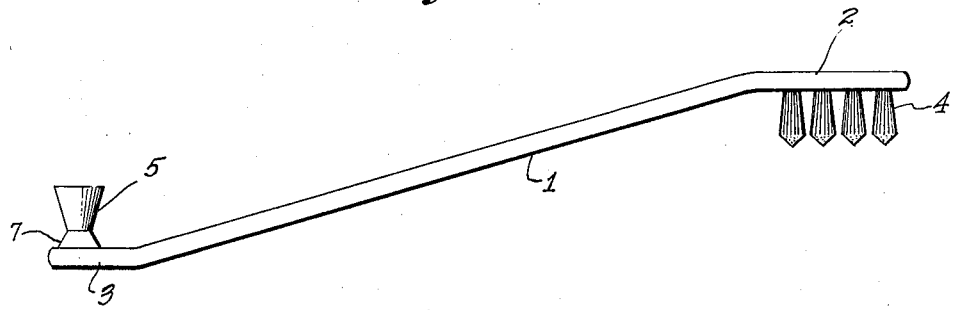
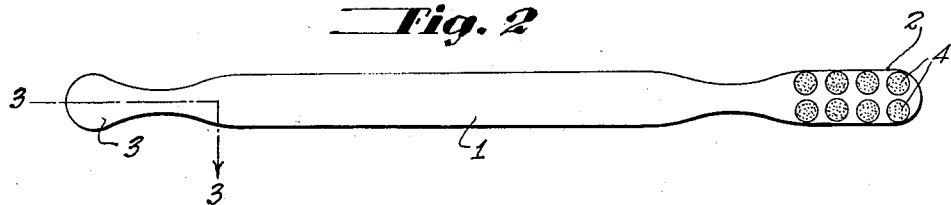
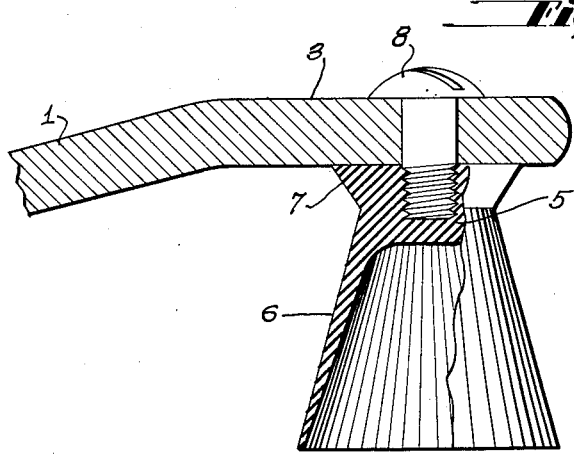
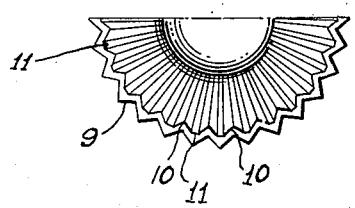
INVENTOR.
Edward Wolfson
BY
ATTORNEY.

Patented Mar. 8, 1938

2,110,315

UNITED STATES PATENT OFFICE 2,110,315

DENTAL APPLIANCE

Edward Wolfson, Jersey City, N. J.

Application August 4, 1936, Serial No. 94,145

2 Claims. (Cl. 128—62)

This invention is a dental appliance and relates more particularly to that type of device adapted to be used by the laity for the keeping of the teeth and gums in proper condition.

More specifically the invention comprises a tooth brush having a handle, one end of which is provided with a brush head with bristles, while the other end of which has a head supporting a gum massage implement. The handle proper is preferably made straight, while the heads of the brush and massage implement are set at an angle of approximately 15°-20° to the handle and in parallel relation to each other, so as to permit more efficient use of the device upon the teeth and gums of the user.

The object of the invention is to provide a simple, economical construction, thoroughly efficient in maintaining oral hygiene.

An important feature of the invention resides in the massage implement which is in the form of a rubber cup with both internal and external serrations extending longitudinally of the inner and outer surfaces, both of which are substantially frusto conical in form. The cup is secured rigidly to its head and is sufficiently resilient to properly conform to the gums of the user, but sufficiently stiff to give the desired massage pressure and to permit it to be properly mounted on the head.

Features of the invention, other than those adverted to, will be apparent from the hereinafter detailed description and claims, when read in conjunction with the accompanying drawing.

The accompanying drawing illustrates one practical embodiment of the invention, but the construction shown therein is to be understood as illustrative, only, and not as defining the limits of the invention.

Figure 1 is a side elevation of a dental appliance embodying the present invention.

Figure 2 is an underneath plan view of the structure of Figure 1.

Figure 3 is an enlarged section in the plane of the line 3—3 of Figure 2 with a portion of the massage implement shown in elevation.

Figure 4 is an underneath fragmental plan view of the open end of the massage implement.

In the device as shown in the drawing, the handle 1 is shown as straight and of sufficient length to permit it to be readily grasped to manipulate the device. The opposite ends of the handle are provided with heads 2 and 3 preferably set between 15° and 20° to the axis of the handle and arranged parallel with one another. One side of the head 2 is provided with bristle tufts 4, while the opposite side of the head 3 is provided with a massage implement 5. The brush head 2 is relatively small and is shown as having eight bristle tufts, so as to produce a relatively small brush surface well adapted to reach the more inaccessible portions of the tooth surfaces, such as the distal surfaces of molars and the lingual surfaces of the lower incisors, which are ordinarily difficult to cleanse. I have found that by providing a relatively small brush and by placing it in angular relation to the handle, as stated, that these surfaces can be efficiently and satisfactorily cleansed and maintained in clean, sterile condition.

The massage implement is made of rubber and in the form of a hollow frusto conical cup 6 having a frusto conical base 7 tapered in the opposite direction from the taper of the cup, so as to afford a broad surface to facilitate its rigid attachment to the head 3. This is accomplished by passing a screw 8 through a hole in the head and threading it into the base 7, so that, when the screw is screwed tightly into place, it will draw the broad surface of the base against the head 3 to rigidly mount the massage implement thereon. In the event that it is desired to attach a new massage implement, the screw may be removed and the change made without difficulty.

The cup 6 is hollow, as stated, and the wall thereof is tapered to a relatively thin edge at the open side of the cup to a thicker wall dimension at the base of the cup and the interior cavity of the cup is rounded out at its base, so as to leave no sharp corners for the lodging of extraneous matter, but to permit the interior of the cup to maintain a clean, sterile condition.

The exterior of the cup is longitudinally fluted or serrated, as indicated at 9, the serrations, flutes or ribs being directly adjacent one another, so as to be side by side. They taper in a direction toward the head as shown. The inside of the cup is also longitudinally ribbed or serrated, as shown at 10, but these ribs are considerably smaller than the ribs 9 on the exterior and staggered with respect to the ribs on the exterior surface, so that the wall is not too thin between the exterior serrations. The interior serrations are spaced apart and taper in the direction of the head to leave between adjacent serrations segmental frusto conical surfaces 11, for I find that with this construction I obtain the desired strength, preclude the lodging of extraneous matter between these interior serrations and at the same time obtain all the advantages of the serrated surfaces.

When the cup is provided with both internal and external serrations, staggered as shown, the free edge of the cup will be of zigzag conformation and of substantially uniform thickness throughout. This is apparent from Figure 4 of the drawing. In use it is found possible, when cleaning the teeth or polishing fillings, to introduce the wall of the cup into interproximal spaces of adjacent teeth and employ the device to cause the internal serrations to act upon one tooth while the external serrations are acting upon the adjacent tooth. In other words, both the internal and external serrations will operate at the same time upon adjacent teeth. The same result is obtained when acting upon inclined planes of the biting surface of the same tooth. During these operations the zigzag edge provides a more abrasive surface than that possible with prior constructions, while the external serrations permit the lateral face of the cup to be employed to clean and polish the surfaces of the teeth and fillings in a more accessible manner than heretofore.

When using the massage implement, it is held against the gums, while a circular motion is imparted thereto. The serrations produce a scraping action which serves to clean the gums about the necks of the teeth and to remove debris from the gum tissue and at the same time produce a mild stimulation to the gum tissue, so necessary to healthy condition thereof.

The head of the massage implement is, as stated, placed in angular relation to the handle in order to permit the implement to be more efficiently applied to those parts of the mouth which are ordinarily inaccessible.

In practice, the massage implement may be used with tooth paste or powder or may be used without. In either event, it will function in an entirely satisfactory manner to keep the gums in proper condition and it may even be used on the teeth more especially to clean away debris at the base of the teeth adjacent the gums for the action of this massager is gentle and there is no tendency of the same to force back the gums from the teeth. I find in practice that the best results are obtained if the cup portion of the massager is approximately as deep as its open end diameter, for this provides a gentle massage which is desired and at the same time insures proper cleansing action.

The foregoing detailed description sets forth the invention in its preferred practical form, but the invention is to be understood as fully commensurate with the appended claims.

Having thus fully described the invention, what I claim as new and desire to secure by Letters Patent is:

1. A massage implement comprising a rubber cup, the wall of which is provided internally with longitudinal serrations extending for substantially the full internal depth of the cup wall and said wall being also provided externally with longitudinal serrations extending for substantially the full height of said wall, with the external serrations circumferentially staggered about the wall of the cup with respect to the internal serrations to provide a zigzag free edge of substantially uniform thickness at the open end of the cup.

2. A massage implement comprising a rubber cup, the wall of which is provided internally with longitudinal serrations extending for substantially the full internal depth of the cup wall and said wall being also provided externally with longitudinal serrations extending for substantially the full height of said wall, with the external serrations circumferentially staggered about the wall of the cup with respect to the internal serrations to provide a zigzag free edge of substantially uniform thickness at the open end of the cup, said cup having, at its closed end, an integral base of frusto conical form with its conical surface diverging in a direction away from the open end of the cup.

EDWARD WOLFSON.